United States Patent [19]

Ditz et al.

[11] Patent Number: 5,096,620

[45] Date of Patent: Mar. 17, 1992

[54] LEAD-ZINC-BOROSILICATE GLASS

[75] Inventors: Hermann Ditz, Landshut; Hartmut Paschke, Ergolding, both of Fed. Rep. of Germany

[73] Assignee: Schott Glaswerke, Mainz, Fed. Rep. of Germany

[21] Appl. No.: 657,045

[22] Filed: Feb. 19, 1991

[30] Foreign Application Priority Data

Feb. 19, 1990 [DE] Fed. Rep. of Germany ....... 4005011

[51] Int. Cl.$^5$ .................... H01B 1/08; C03C 3/074
[52] U.S. Cl. ............................ 252/518; 501/32; 501/76; 501/79
[58] Field of Search ............ 501/32, 76, 77, 79; 252/518; 428/426, 432

[56] References Cited

U.S. PATENT DOCUMENTS

| | | | |
|---|---|---|---|
| 3,787,218 | 1/1974 | Dietz et al. | |
| 3,859,126 | 1/1975 | Dietz et al. | 428/335 |
| 3,959,543 | 5/1976 | Ellis | 252/518 X |
| 4,041,436 | 8/1977 | Kouchich et al. | 428/432 X |
| 4,147,670 | 4/1979 | Shohata et al. | 501/61 X |
| 4,172,922 | 10/1979 | Merz et al. | 428/432 |
| 4,374,049 | 2/1983 | Ellis et al. | 252/518 X |
| 4,386,021 | 5/1983 | Kazuo et al. | 252/519 |
| 4,551,268 | 11/1985 | Eda et al. | 252/519 |

OTHER PUBLICATIONS

Chemical Abstract, vol. 107, No. 12, 21, Sep. 1987, p. 727 (Hitachi), 107524d.
Chemical Abstract, vol. 102, No. 10, 11; Mar. 11, 1985, p. 656 88529n (Meidensha), 88529n.
Sprechsaal, vol. 120, No. 5, May 1987; pp. 424, 426, 428, 429.

*Primary Examiner*—Karl Group
*Attorney, Agent, or Firm*—Millen, White & Zelano

[57] ABSTRACT

Lead-zinc-borosilicate glass is provided having a boundary wetting angle with respect to ZnO of at most 40°, a processing temperature of at most 540° C., a composition, consisting essentially of, in percent by weight on oxide basis, of

| | |
|---|---|
| 4.0–7.0 | $SiO_2$ |
| 13.0–17.0 | $B_2O_3$ |
| 43.0–50.0 | PbO |
| 24.0–29.0 | ZnO |
| 4.0–7.0 | CuO |
| 1.5–2.5 | $Al_2O_3$ | and optionally 0–3 $SnO_2$, $Bi_2O_3$ or $MoO_3$, as well as 0–1 $Cr_2O_3$. The glass is particularly suitable for sealing electronic components, especially varistors made of zinc oxide, as well as a sintering aid for zinc oxide ceramics, especially in the production of varistors from zinc oxide.

20 Claims, No Drawings

LEAD-ZINC-BOROSILICATE GLASS

BACKGROUND OF THE INVENTION

This invention relates to glass compositions, in particular, lead-zinc-borosilicate glasses, and to their application as sealants.

Lead-zinc-borosilicate glass is the primary material for the passivation of zinc oxide varistors. Such varistors of zinc oxide ceramic are distinguished by a nonlinear current-voltage characteristic. The resistance of these varistors is very high at low voltages and very suddenly drops precipitously when a certain voltage value has been exceeded; consequently, these varistors have a particular utility for conducting away overvoltages wherever they occur, for example, in high-tension lines, computers, and other electrical and electronic systems.

The electrical properties of the varistor are, however, sensitive to the long-term effects of water vapor, air, and other gases. In order to prevent a deleterious change in the current-voltage characteristic of the varistor, its surface must, therefore, be sealed in gas-tight fashion. The most advantageous and permanent method of sealing is encapsulation in glass. Encapsulation takes place usually by applying a layer of powdered glass (optionally in a suitable suspension agent) to the component to be encapsulated and subsequently fusing the glass powder layer to form a closed glass coating (an overglaze).

While not being directed to zinc oxide varistors in particular, U.S. Pat. No. 3,859,126, issued Jan. 7, 1975, discloses a lead-zinc-borate glass overglaze in combination with ceramic substrates, e.g., alumina, accommodating up to 12 percent by weight of various other oxides such as, for example, $SiO_2$, CaO, $V_2O_5$, BaO, $Bi_2O_3$, $TiO_2$, and $ZrO_2$, and/or may optionally accommodate up to 25 percent by weight of dispersed particulate ceramic materials, e.g., various zirconium silicates, $SiO_2$, $Al_2O_3$, $TiO_2$, and crystallized glass particles of the lattice-aluminasilica type, the preferred dispersed particulate ceramic being silicate.

For the passivation of zinc oxide varistors, two different lead-zinc-borate glasses are presently known. On the one hand, there is a $Bi_2O_3$-containing glass having the composition (% by weight) of 5.5, $SiO_2$; 19, $B_2O_3$; 37.6, PbO; 4.7, CuO; 22.6, ZnO; 1.3, $Al_2O_3$; 3.4, $SnO_2$; 3.9, $Bi_2O_3$; and 1.6, $MoO_3$, as well as a glass containing zirconium dioxide which has a composition (% by weight) of 5.2, $SiO_2$; 20, $B_2O_3$; 42, PbO; 6, CuO; 24, ZnO; 0.2, $Al_2O_3$; and 1.1, $ZrO_2$. These glasses, however, still exhibit certain drawbacks, especially the requirement of a rather high processing temperature of about 550° C. which can have a negative effect on the properties of the varistor, for example, by rounding the current-voltage characteristic, i.e., so that there is a less precipitous change. Moreover, the conventional glasses have relatively high boundary wetting angles with respect to zinc oxide of about 50°–90° for the bismuth-containing glass and about 40°–80° for the zirconium-containing glass. Such high boundary wetting angles make it difficult to produce pore-free coatings.

SUMMARY OF THE INVENTION

An object of the invention is thus to provide a lead-zinc-borosilicate glass composition particularly useful for the encapsulation of zinc oxide varistors which exhibits improved properties as compared with the known glasses, especially a boundary wetting angle with respect to zinc oxide of at most 40° and a processing temperature of at most 540° C.

Another object is to provide an improved article of manufacture combining said glass and a ZnO substrate.

Still another object is to provide an improved encapsulated varistor.

Upon further study of the specification and appended claims, further objects and advantages of this invention will become apparent to those skilled in the art.

To achieve these objects, there is provided a lead-zinc-borosilicate glass having a boundary wetting angle with respect to ZnO of at most 40°, a processing temperature of at most 540° C., and a composition, in percent by weight on an oxide basis, consisting essentially of

| | |
|---|---|
| 4.0–7.0 | $SiO_2$ |
| 13.0–17.0 | $B_2O_3$ |
| 43.0–50.0 | PbO |
| 24.0–29.0 | ZnO |
| 4.0–7.0 | CuO |
| 1.5–2.5 | $Al_2O_3$ | and optional components described hereinafter.

The content of $SiO_2$ in percent by weight ranges between 4.0 and 7.0. If the $SiO_2$ proportion drops below 4% by weight, the expansion coefficient rises; this can lead to incompatibilities between the glass and ZnO. Furthermore, the crystallizing tendency of the glass becomes higher. If the $SiO_2$ proportion exceeds 7% by weight, the processing temperature increases excessively. A proportion of $SiO_2$ of 4.5–5.5% by weight is especially advantageous.

The processing temperature is understood to mean the temperature at which the glass possesses the required viscosity of not more than $10^6$ dPa s which permits the formation of a dense, uniform glaze within a glazing period of about 20 minutes. Otherwise, at higher viscosities, the glazing period would be excessive, and/or the glazing oftentimes would not be sufficiently dense or uniform. Such characteristics can cause damage to the varistor. In any case, the processing temperature should not exceed 540° C.

The $B_2O_3$ content ranges between 13 and 17% by weight. Were the $B_2O_3$ content to drop below 13% by weight, the processing temperature interval, i.e., the difference between the processing temperature and the temperature of the onset of crystallization, would become so small as to require a very complicated temperature when using the glass. Were the $B_2O_3$ content to exceed 17% by weight, there would be a considerable tendency for the glass to demix. (Demixing or segregation refers to the formation of areas having a different chemical composition and density from the glass as a whole and can be detected visually as "cords" or "striae" in the glass.) A proportion of $B_2O_3$ of 14–15% by weight has proven to be particularly suitable.

The lead oxide proportion likewise affects the processing temperature. If the lead oxide content drops to below 43% by weight, the processing temperature becomes too high; at the same time, the electrical resistance of the glass decreases, which is undesirable. If the lead oxide proportion exceeds 50% by weight, a high expansion coefficient results, whereby it is generally no longer possible for the thermal-expansion to accommodate the components to be coated. A PbO content of 44.5–48.5% by weight is particularly suitable.

The glass furthermore has a zinc oxide proportion of between 24 and 29% by weight. If the zinc oxide proportion drops below the lower range limit, the processing temperature increases excessively; exceeding the limit of 29% by weight results in a strong tendency for the glass to crystallize, as well as a reduced processing temperature interval. Zinc oxide contents of between 26 and 29% by weight are particularly advantageous.

If the copper oxide proportion drops below 4% by weight, the glass shows a poorer adhesion to zinc oxide, and the boundary wetting angle with respect to zinc oxide is increased. Furthermore, the electrical properties, for example, of a varistor to be encapsulated, are impaired which is manifested in a rounding of the current-voltage characteristic. Copper oxide contents of above 7% by weight, however, are likewise undesirable since a glass with such a high copper oxide proportion shows a strong demixing tendency. Proportions of copper oxide of 4.5–5.5% by weight are most beneficial.

The aluminum oxide content is to range between 1.5 and 2.5% by weight since, in case the value drops below this range, an increased expansion coefficient results, while exceeding this range results in an increased processing temperature.

The glass may also contain, in small amounts of respectively up to 3% by weight, the compounds $SnO_2$, $Bi_2O_3$ and $MoO_3$. These additives improve the current-voltage characteristic is a function of the particular ceramic employed. The same effect is displayed by an addition of up to 1% by weight of $Cr_2O_3$. Moreover, $Cr_2O_3$ can also bring about an improvement in the wetting characteristic and the adhesion of the glaze. If added, the compounds $SnO_2$, $Bi_2O_3$, $MoO_3$ and $CrO_3$ should not amount to less than 0.05% by weight in total since below this value there is hardly any recognizable effect.

The glasses can be very advantageously processed at a temperature of less than 540° C., and in the normal case less than 510° C. Therefore, these glasses are especially suitable for relatively mild operations during the encapsulation of electronic components, for example resistors, and particularly for the encapsulation of varistors made from zinc oxide. Additional advantages of the glass reside in the improved wetting of zinc oxide which is manifested by a lower boundary wetting angle. The adhesion of the glass to zinc oxide is likewise very good. When used for the encapsulation of electronic components, especially of varistors, the varistor blank can be demfused into a glass tube having an appropriate length. The conventional procedure is to apply a layer of powdered glass to the blank, and this layer is subsequently fused into a glaze. For this purpose, the glass powder conventionally has an average grain size in the range of from 5 to 25 μm and is suspended in a suitable suspension medium, e.g., the organic vehicles noted on col. 5, lines 24–36 of U.S. Pat. No. 3,859,126, a vegetable or mineral oil, or preferably water with the addition of a binder such as, for example, methyl- or ethylcellulose. The suspension medium is removed completely from the glass powder layer during the heating step for fusing the glaze.

The glass is also particularly useful as a sintering aid during the manufacture of zinc oxide ceramic, for example in the production of varistors on ZnO basis. For this purpose, the glass is admixed in pulverized form (average particle size below about 10 μm) to the zinc oxide to be sintered, in amounts of about 0.1–10% by weight. In case of glasses utilized as sintering aids, it is especially advantageous for the glasses to contain the optional above-mentioned compounds, such as $SnO_2$, $Bi_2O_3$, $MoO_3$ and/or $Cr_2O_3$.

Besides having a special suitability for zinc oxide ceramic, the glass is, of course, also suitable for bonding ceramics to one another (for example $Al_2O_3$, steatite, etc.) and to metals (e.g., "Kovar") which have relatively similar thermal expansions at temperatures of about 500° C. The glass is also suitable as a basic glass for the production of composite glasses.

The glasses are distinguished, above all, by a low processing temperature of preferably about 500° C., by a very high specific electric volume resistance at a temperature of 250° C. of about $10^{10}$ to $10^{12}$ $\Omega \times$cm. When using the glass for glazes, there are produced glazes of high transparency which are substantially devoid of bubbles and which are absolutely gas-tight. Owing to the low boundary wetting angle, the glazing of zinc oxide components is particularly simple, and owing to the improved adhesion of the glaze on the zinc oxide, especially resistant coatings are obtained.

Without further boration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications, cited above and below, and of corresponding application Federal Republic of Germany P 40 05 011.4-45, filed Feb. 19, 1990, are hereby incorporated by reference.

EXAMPLES

Examples 1-7

The composition of exemplified glasses and their physical properties are compiled in the following table.

Seven glasses of different compositions were obtained by conventional melting of conventional glass raw materials, i.e., by mixing the raw materials intimately and then melting at temperatures of about 950° to 1300° C. Example 5, as a comparative example, demonstrates the strong demixing tendency by schlieren formation. Subsequently, the physical properties of the respective glasses were determined, namely the coefficient of thermal expansion α for a range from 20° to 300° C., the transformation temperature Tg and the processing temperature. The crystallization temperature was determined in accordance with the so-called gradient method as follows: Glass powder, obtained by comminuting the cooled glass, having an average particle size of about 10 μm is applied to a platinum carrier plate and treated for 30 minutes in a tubular furnace wherein a defined temperature profile is present over the furnace length. Then the molten glass is visually inspected with 20-fold magnification, determining the site of onset of crystallization and, concomitantly therewith, the associated temperature thereof.

The glass was furthermore visually inspected for demixing phenomena. (It is of interest to note that this invention does not contemplate the use of discrete particles of alumina within the resultant glaze.)

The electrical volume resistance Ω×cm was determined at 250° C., with the results being presented in logarithmic form. Further, the boundary wetting angle of the glasses with respect to ZnO was also determined, yielding values of between 10° and 40°. The determination of the boundary wetting angle with respect to ZnO took place conventionally with the aid of a heating microscope. For this purpose, a cylindrical test specimen having a diameter of 8 mm and a height of 8 mm made from the glass to be examined is heated on a zinc oxide plate as the substrate for 20 minutes to the processing temperature of the respective glass. The test specimen is converted during this procedure into a so-called fluid lump, and the boundary wetting angle arising at the rim of the fluid lump is measured.

TABLE

| Oxide | Melt 1 % by Wt. | Melt 2 % by Wt. | Melt 3 % by Wt. | Melt 4 % by Wt. | Melt 5 % by Wt. | Melt 6 % by Wt. | Melt 7 % by Wt. |
| --- | --- | --- | --- | --- | --- | --- | --- |
| $SiO_2$ | 4.75 | 7 | 4.75 | 4.75 | 4.66 | 4 | 6 |
| $B_2O_3$ | 14.25 | 14.25 | 14.25 | 17 | 13.97 | 13 | 16 |
| PbO | 47.5 | 45.25 | 45.1 | 44.75 | 49.02 | 48.5 | 43 |
| ZnO | 26.6 | 26.6 | 29.0 | 26.6 | 23.63 | 27.6 | 28.5 |
| CuO | 5.0 | 5.0 | 5.0 | 5.0 | 6.86 | 5.0 | 4 |
| $Al_2O_3$ | 1.90 | 1.90 | 1.90 | 1.90 | 1.86 | 1.90 | 2.50 |
| Properties: | | | | | | | |
| $\alpha_{(\cdot 10-6K^{-1})}$ | 6.3 | 6.1 | 6.1 | 5.9 | 6.6 | 6.6 | 6.2 |
| Tg (°C.) | 383 | 403 | 390 | 410 | 375 | 379 | 410 |
| Processing Temperature (°C.) | 500 | 530 | 510 | Not Calcd. | 500 | 510 | 540 |
| Crystallizing Temp. (°C.) | 570 | 580 | 540 | Not Calcd. | 560 | 560 | 600 |
| Unmixing | None | None | Not Calcd. | Initial Onset | Schlieren Formation | None | None |
| $\log \rho_{250}$ | 11.34 | 10.80 | 11.2 | | | 11.20 | 9.7 |
| Boundary Wetting Angle | 10° | 35° | 30° | 35° | 25° | 15° | 40° |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lead-zinc-borosilicate glass having a boundary wetting angle with respect to ZnO of at most 40°, a processing temperature of at most 540°C., and a composition, in percent by weight on an oxide basis consisting essentially of

| 4.0–7.0 | $SiO_2$ |
| --- | --- |
| 13.0–17.0 | $B_2O_3$ |
| 43.0–50.0 | PbO |
| 24.0–29.0 | ZnO |
| 4.0–7.0 | CuO |
| 1.5–2.5 | $Al_2O_3$ |
| 0–3 | $SnO_2$ |
| 0–3 | $Bi_2O_3$ |
| 0–3 | $MoO_3$ |
| 0–1 | $Cr_2O_3$. |

2. A lead-zinc-borosilicate glass according to claim 1 having a composition, in percent by weight on an oxide basis, consisting essentially of:

| 4.5–5.5 | $SiO_2$ |
| --- | --- |
| 14.0–15.0 | $B_2O_3$ |
| 44.5–48.5 | PbO |
| 26.0–29.0 | ZnO |
| 4.5–5.5 | CuO |
| 1.5–2.5 | $Al_2O_3$. |

3. A lead-zinc-borosilicate glass according to claim 1, wherein, in percent by weight on an oxide basis, at least 0.05 of at least one of said $SnO_2$, $Bi_2O_3$, $MoO_3$ or $Cr_2O_3$ is in the glass.

4. A lead-zinc-borosilicate glass according to claim 2, wherein, in percent by weight on an oxide basis, at least 0.05 of at least one of said $SnO_2$, $Bi_2O_3$, $MoO_3$ or $Cr_2O_3$ is in the glass.

5. An article of manufacture containing ZnO as a substrate bonded to a lead zinc-zinc-borosilicate glass having a boundary wetting angle with respect to ZnO of at most 40°, a processing temperature of at most 540° C., and a composition, in percent by weight on an oxide basis consisting essentially of

| 4.0–7.0 | $SiO_2$ |
| --- | --- |
| 13.0–17.0 | $B_2O_3$ |
| 43.0–50.0 | PbO |
| 24.0–29.0 | ZnO |
| 4.0–7.0 | CuO |
| 1.5–2.5 | $Al_2O_3$ |
| 0–3 | $SnO_2$ |
| 0–3 | $Bi_2O_3$ |
| 0–3 | $MoO_3$ |
| 0–1 | $Cr_2O_3$. |

6. An article of manufacture according to claim 5 said glass having a composition, in percent by weight on an oxide basis, consisting essentially of

| 4.5–5.5 | $SiO_2$ |
| --- | --- |
| 14.0–15.0 | $B_2O_3$ |
| 44.5–48.5 | PbO |
| 26.0–29.0 | ZnO |
| 4.5–5.5 | CuO |

| | |
|---|---|
| -continued | |
| 1.5–2.5 | Al$_2$O$_3$ |

7. An article of manufacture according to claim 5 wherein said article is a zinc oxide varistor encapsulated with an overglaze of said lead-zinc borosilicate glass.

8. An article of manufacture according to claim 6, wherein said article is a zinc oxide varistor encapsulated with an overglaze of a glass.

9. An article of manufacture according to claim 5, wherein in percent by weight on an oxide basis, at least 0.05 of at least one of said SnO$_2$, Bi$_2$O$_3$, MoO$_3$ or Cr$_2$O$_3$ is in the glass.

10. An article of manufacture according to claim 6 wherein in percent by weight on an oxide basis, at least 0.05 of at least one of said SnO$_2$, Bi$_2$O$_3$, MoO$_3$ or Cr$_2$O$_3$ is in the glass.

11. A sintered zinc oxide ceramic containing as a sintering aid, a lead-zinc-borosilicate glass having a boundary wetting angle with respect to ZnO of at most 40°, a processing temperature of at most 540° C., and a composition, in percent by weight on an oxide basis consisting essentially of

| | |
|---|---|
| 4.0–7.0 | SiO$_2$ |
| 13.0–17.0 | B$_2$O$_3$ |
| 43.0–50.0 | PbO |
| 24.0–29.0 | ZnO |
| 4.0–7.0 | CuO |
| 1.5–2.5 | Al$_2$O$_3$ |
| 0–3 | SnO$_2$ |
| 0–3 | Bi$_2$O$_3$ |
| 0–3 | MoO$_3$ |
| 0–1 | Cr$_2$O$_3$. |

12. A sintered zinc oxide ceramic according to claim 11 said glass having a composition, in percent by weight on an oxide basis, consisting essentially of:

| | |
|---|---|
| 4.5–5.5 | SiO$_2$ |
| 14.0–15.0 | B$_2$O$_3$ |
| 44.5–48.5 | PbO |
| 26.0–29.0 | ZnO |
| 4.5–5.5 | CuO |
| 1.5–2.5 | Al$_2$O$_3$. |

13. A sintered zinc oxide ceramic according to claim 11 wherein, in percent by weight on an oxide basis, at least 0.05 of at least one of said SnO$_2$, Bi$_2$O$_3$, MoO$_3$ or Cr$_2$O$_3$ is in the glass.

14. A sintered zinc oxide ceramic according to claim 12 wherein, in percent by weight on an oxide basis, at least 0.05 of at least one of said SnO$_2$, Bi$_2$O$_3$, MoO$_3$ or Cr$_2$O$_3$ is in the glass.

15. A varistor comprising the sintered zinc oxide of claim 7.

16. A varistor comprising the sintered zinc oxide of claim 8.

17. A varistor comprising the sintered zinc oxide of claim 9.

18. A varistor comprising the sintered zinc oxide of claim 10.

19. A varistor comprising the sintered zinc oxide of claim 7, encapsulated with a composition, in percent by weight of an oxide basis consisting essentially of

| | |
|---|---|
| 4.0–7.0 | SiO$_2$ |
| 13.0–17.0 | B$_2$O$_3$ |
| 43.0–50.0 | PbO |
| 24.0–29.0 | ZnO |
| 4.0–7.0 | CuO |
| 1.5–2.5 | Al$_2$O$_3$ |
| 0–3 | SiO$_2$ |
| 0–3 | B$_2$O$_3$ |
| 0–3 | MoO$_3$ |
| 0–1 | Cr$_2$O$_3$. |

20. A varistor according to claim 19, wherein at least 0.05 percent by weight of at least one of said SnO$_2$, Bi$_2$O$_3$, MoO$_3$ or Cr$_2$O$_3$ is present in the encapsulation composition.

* * * * *